Nov. 22, 1938. R. O. LUNDHOLM ET AL 2,137,579
ALTERNATING CURRENT POWER CIRCUIT
Filed April 1, 1936
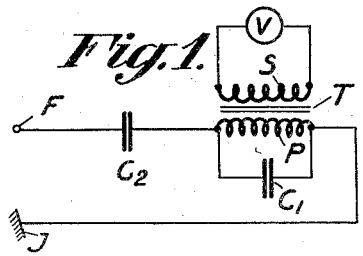
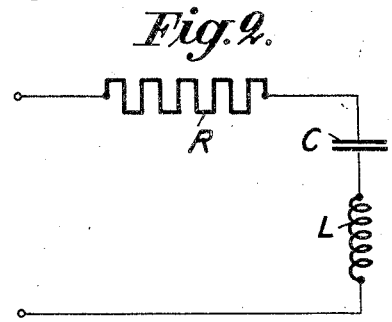
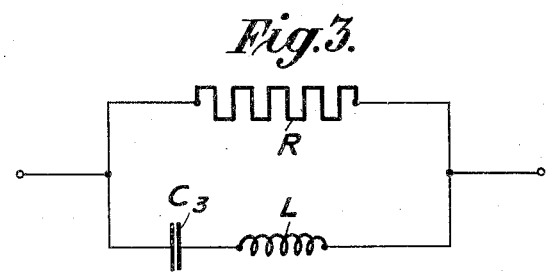
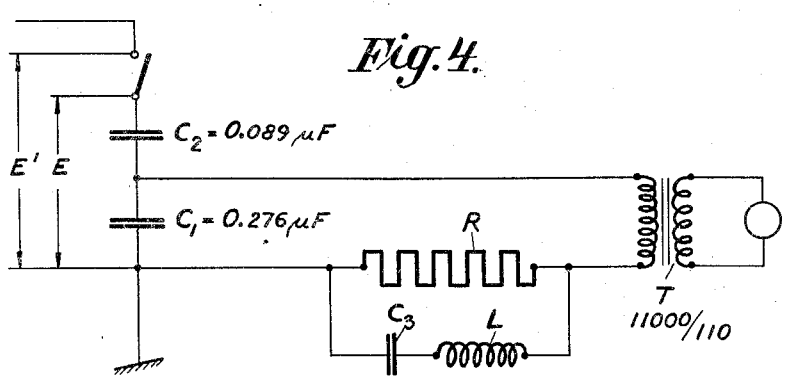
INVENTORS
R. O. Lundholm
H. Spanne
By Glascock Downing & Seebold
Attys.

Patented Nov. 22, 1938

2,137,579

UNITED STATES PATENT OFFICE 2,137,579

ALTERNATING CURRENT POWER CIRCUIT

Ragnar Olof Lundholm, Djursholms Ekeby, and Henning Spanne, Sundbyberg, Sweden, assignors to Telefonaktiebolaget L. M. Ericsson, Stockholm, Sweden, a company of Sweden Application April 1, 1936, Serial No. 72,164
In Sweden April 1, 1935

5 Claims. (Cl. 171—97)

The present invention relates to such electric alternating current power circuits which include inductances having a bent magnetic characteristic in combination with capacities. More particularly the invention relates to alternating current circuits of this kind in which the inductances are connected in series with the capacities to an alternating current source. Typical of such circuits are the so-called condenser type voltage transformers in which a measuring instrument is connected through the intermedium of an instrument transformer having an iron core to a capacitive voltage divider, across which the voltage to be measured is connected.

The invention is illustrated on the attached drawing forming part of this specification, in which—

Figure 1 shows the circuit diagram of a known condenser type voltage transformer in which the invention may find application.

Figure 2 shows a circuit diagram of a simple alternating current circuit comprising an inductance having a bent magnetic characteristic in series with a capacity and including a damping resistance, positioned according to the invention.

Figure 3 shows the damping resistance of Figure 2 provided with a by-pass circuit for short-circuiting the resistance at normal operating frequency.

Figure 4 shows the circuit diagram of the known condenser type voltage transformer according to Figure 1 provided, according to the invention, with a damping circuit of the type illustrated in Figure 3.

In the known condenser type voltage transformer illustrated in Figure 1 the capacitive voltage divider, which is assumed to include the part capacities $C_1$ and $C_2$, is connected between one conductor F of a high-tension line and earth J, while the primary winding P of the magnetic transformer T is included between earth J and the point of connection between the part capacities $C_1$ and $C_2$. The secondary winding of the transformer is connected to a load consisting, for instance, of a voltmeter V. Condenser type voltage transformers are characterized by a high load capacity, the errors in the ratio of transformation caused by the load being small in such transformers due to the fact that the leakage reactance of the magnetic transformer T is entirely or partly compensated by the capacitive reactance of the voltage divider so that the voltage drop is determined mainly by the ohmic resistance in the windings of the magnetic transformer which resistance can be made comparatively small.

Tests made both in the laboratory and in practical operation have shown, however, that the simple arrangement represented in Figure 1 has a fundamental disadvantage. If, for example, a sudden and comparatively great voltage variation occurs across the voltage divider, for instance due to the occurrence of an earth fault in the net work or upon the connecting into circuit of a previously tensionless voltage divider, there occurs often a peculiar magnetic saturation phenomenon which manifests itself through an extraordinary increase of the magnetizing current so that the latter obtains a value which can be of the order of magnitude of 100 times the normal magnetizing current or still higher. The magnetic transformer is then intensely heated and the voltmeter measures the voltage wrongly. In addition oscillations can often be observed on the latter. The condition can become stationary, the magnetic transformer being then heated to so high a temperature that it finally breaks down.

Similar phenomena have occurred in systems providing for voltage regulation by means of so called series capacitors. In said latter systems the phenomena generally occur when the inductive load on the system is great in relation to the active load, for instance when a great number of idly running motors are connected to the line. It has been proposed to suppress the saturation phenomena in such arrangements for voltage regulation, by connecting an ohmic resistance in series with the condenser. Such a solution of the problem of preventing the occurrence of the saturation phenomenon is, however, often less satisfactory, and it is entirely useless in connection with condensor type voltage transformers on account of the great errors in the ratio of transformation which the introduction of such a resistance would cause.

It is the object of the present invention to provide novel means for suppressing the undesired magnetic saturation phenomena, which novel means avoid the inconveniences found in the means hitherto proposed.

Oscillographic investigations made by us have shown that when the saturation phenomenon occurs the current contains undamped sub-harmonics of various frequencies in spite of the fact that a sinus-shaped voltage is impressed on the circuit. There is always a certain sub-harmonic which dominates. As to which sub-harmonic will be the highest during a certain test, this seems to depend upon incidental conditions, such as for example on the moment when the disturbance sets in, and both odd sub-harmonics (1/3, 1/5 etc. of the operating frequency) and even sub-harmonics (1/2, 1/4, 1/6 etc. of the operating frequency) may be produced. Evidently the induction in the iron core of the magnetic transformer and thus the transformer inductance adjusts itself to such a value that resonance is obtained for the sub-harmonic in question.

One way of explaining the presence of the low frequency oscillations is the following. On account of the equalization of the charges in the voltage divider, or on account of the rush of current caused by the connecting of the voltage divider into circuit, an intermittent direct current component passes through the inductance and saturates the iron. Consequently, the inductance value decreases and the operating current increases.

During the half-period or half-periods coinciding with the condition of saturation the current I will consequently be abnormally high causing a detrimental heating of the transformer winding, and in addition the condenser $C_1$ connected in parallel with said winding will receive a charge exceeding the one which corresponds to the operating frequency, said abnormally high charge being in turn the cause of a new condition of saturation. At the same time normal induction sets in whereupon the energy oscillations continue at a comparatively low frequency and cause anew a condition of saturation. The energy required for maintaining the oscillations can be assumed to be supplied during half-periods of the operating frequency at intervals of preferably 3, 5, 7 etc. periods.

By suitably dimensioning the magnetic transformer it is possible to create such conditions that the resistance can never fall to such a low value that the above described phenomenon of resonance occurs for the fundamental or for a higher harmonic, the transformer winding having on account of the field through the air, a certain minimum inductance which can never be sub-passed. The simplest manner of getting rid of the phenomenon for the subharmonics as well would be, from a theoretical point of view, to go so far down with the normal iron induction that for no disturbance the latter can surpass the critical value. Both theoretical and practical investigations have shown, however, that in such a case one must go down under inductances corresponding to $B=3000$, so that the voltage transformer would become considerably more expensive, and, furthermore, its properties of voltage transformation would become impaired.

Since according to the above the phenomenon is essentially a resonance phenomenon it should be possible to suppress the same with the aid of damping resistances. The influence of a purely ohmic load resistance on the secondary side of the voltage transformer has been investigated but was found to be insufficient. The same is true for a parallel resistance on the primary side. This unsatisfactory effect can be explained by the fact that on account of the low frequency the sub-harmonics present in the iron induction will have a comparatively insignificant influence on the voltage wherefore the load on damping resistances which are connected to the voltage varies comparatively little when the phenomenon occurs and as a consequence the influence of the resistance on the phenomenon also will become small. In the primary current supplied to the magnetic transformer, on the other hand, the sub-harmonic is very prominent. According to the present invention a resistance is therefore included in series with the primary winding of the magnetic transformer. Tests have shown that a resistance incorporated in this manner will have a good damping effect. According to the tests the resistance value, however, must be rather high. Preferably the resistance R is dimensioned so that the circuit will become aperiodic when the inductance value corresponds to the condition of saturation. For an arrangement according to Figure 2 the aperiodic condition occurs for $$R=2\sqrt{\frac{L}{C}}$$

In the connection according to Figure 1, where the leakage inductance is equal to the capacitive reactance, the aperiodic condition will consequently be obtained for $$R=\frac{2}{\omega(C_1+C_2)}$$

where $\omega$ designates the operating frequency.

Thus the resistance should be at least twice the capacitive reactance of a condenser having the capacity $C_1+C_2$ in the condenser type voltage transformer according to Figure 1.

Through the introduction of an ohmic resistance of this magnitude into the electrical circuits in question the saturation phenomena can thus be avoided. However, the introduction of an ohmic resistance into the circuit entails in certain cases a certain limitation of the utility of the apparatus. The load capacity of a condenser type voltage transformer would, for instance, be reduced through the resistance. In arrangements for regulating the voltage in power transmission lines by means of series capacitors the introduction of a series resistance would reduce the efficiency to such an extent that the arrangement would become practically useless.

The above mentioned disadvantage is eliminated according to the invention by shunting the resistance with an impedance the impedance value of which is small at the operating frequency but becomes of sufficient magnitude for the sub-harmonics to cause the latter to pass the ohmic resistance. A circuit diagram for such a damping circuit is shown in Figure 3. As is immediately understood this arrangement, in which the shunt contains a capacity $C_3$ in series with an inductance L, will pass the operating current without any considerable losses provided that $\omega L$ is made equal to $$\frac{1}{\omega C_3}$$

or, in other words, if the circuit is tuned to resonance at the operating frequency. At the operating frequency the resonant circuit acts as a short-circuit for the resistance R, wherefore at said frequency the resistance cannot cause any voltage drop or error in the transformation ratio. For other frequencies (sub-harmonics), on the other hand, the circuit $C_3,L$ has a comparatively high reactance so that there is no short-circuiting of the resistance for said frequencies. The damping effect of the resistance for these frequencies is practically unimpaired and no oscillations whatever of sub-harmonics can be set up. The arrangement therefore makes it possible to design the intermediary magnetic voltage transformer with normal induction whereby its price becomes low and the errors of transformation ratio small while at the same time the arrangement becomes safe against the occurrence of the undesired condition of saturation.

In order to cause a good damping the reactance of the shunt should be selected so as to allow that for the second sub-harmonic at least 50 percent of the current will pass through the resistance R. Thus:

$$\frac{2}{\omega C_3} - \frac{\omega L}{2} \geqq R \geqq \frac{2}{\omega(C_1+C_2)}$$

or $$\frac{1,5}{\omega C_3} \geqq R \geqq \frac{2}{\omega(C_1+C_2)}$$

A number of tests have confirmed that circuit arrangements containing a damping circuit dimensioned according to the above are freed from saturation phenomena caused by sub-harmonics. Tests made on an arrangement according to Figure 4 with inductance values according to the table below have given the following results:

L=39.5 H at 50 v. 50 p/s
L=43.0 H at 100 v. 50 p/s
L=47.0 H at 300 v. 50 p/s
L=47.5 H at 700 v. 50 p/s

The condition of saturation was observed on the voltmeter V. In the table below is stated for which resistances the phenomenon was observed when the arrangement was cut in and out of circuit 50 times in sequence.

Did the phenomenon of oscillation occur:

| R Ohm | E=20 E'=19.5 | 25 24.5 | 30 29 | 35 34 | 40 38 | 45 43 | 50 47 | kv. kv. |
|---|---|---|---|---|---|---|---|---|
| ∞ | yes | yes | yes | | | | | |
| 100000 | no | no | no | yes | yes | | | |
| 80000 | | | | no | no | yes | yes | |
| 60000 | | | | | | no | no | |
| 40000 | | | | | | | | |
| 20000 | | | | | | | | |
| 10000 | | | | | | no | no | |
| 5000 | | no | no | no | no | yes | | |
| 2500 | no | yes | yes | | | | | |
| 0 | yes | yes | | | | | | |

E denotes the voltage on the condenser at the moment of interruption. E' denotes the voltage of the network before connecting the condenser.

The invention is not limited to the embodiments shown but can be modified in different ways within the scope of the appended claims. It is thus conceivable to keep the damping resistance normally short-circuited by means of a shunt containing an interrupting contact which is arranged to interrupt the shunt under the control of a suitable relay adapted to operate upon the occurrence of the above described phenomenon, for example a relay actuated by the frequency of the sub-harmonics.

We claim:

1. In electric alternating current power systems including an inductance having a bent magnetic characteristic in series with a capacity the combination of selective means for separating subfrequency currents from the current component of fundamental frequency, said selective means being included in series with said inductance, and means for damping said subfrequency currents whereby to suppress magnetic saturation phenomena caused thereby.

2. In electric alternating current power systems including a capacity in series with an inductance having a bent magnetic characteristic the combination of an impedance having a low impedance value for the fundamental frequency and a high impedance value for subfrequency currents, said impedance being connected in series with said inductance, and a damping resistance shunted to said impedance and dimensioned to suppress magnetic saturation phenomena by suppressing the subfrequency currents which are the cause of said phenomena.

3. The combination according to claim 2, characterized in that the damping resistance is of the order of magnitude of twice the capacitive reactance of the circuit.

4. In electric alternating current power systems including a capacity in series with an inductance having a bent magnetic characteristic the combination of a damping resistance included in the path of the current, and an impedance shunting said damping resistance and tuned to resonance for the operating frequency, said damping resistance being so dimensioned as to effect suppression of magnetic saturation phenomena through suppression of the sub-harmonic current components causing such phenomena.

5. In an alternating current measuring system the combination of a source of voltage, a capacitive voltage divider connected across said source of voltage, a magnetic voltage transformer having an iron core, the primary winding of said voltage transformer being connected across part of said capacitive voltage divider, a damping resistance included in series with said primary winding, an impedance connected in parallel with said damping resistance and tuned to resonance for the operating frequency, said damping resistance being so dimensioned as to suppress magnetic saturation phenomena by suppressing subharmonic current components causing such phenomena.

RAGNAR OLOF LUNDHOLM.
HENNING SPANNE.